UNITED STATES PATENT OFFICE.

WILLIAM F. BEASLEY, OF PLYMOUTH, NORTH CAROLINA.

RUBBER COMPOSITION.

1,049,039.  Specification of Letters Patent.  Patented Dec. 31, 1912.

No Drawing.  Application filed June 20, 1911. Serial No. 634,360.

*To all whom it may concern:*

Be it known that I, WILLIAM F. BEASLEY, a citizen of the United States, and resident of Plymouth, in the county of Washington and State of North Carolina, have invented certain new and useful Improvements in Rubber Composition and Method of Manufacture, of which the following is a specification.

This invention has for its object the utilization of old rubber and it has been my purpose to make from such rubber a composition which may be used for many of the purposes to which new rubber is applicable, and to devise a process of treatment which will enable me to produce the composition cheaply and easily.

The novel features of the invention will appear from the following detailed description.

Processes have heretofore been devised for reclaiming rubber and while they have produced satisfactory articles of compositions their use has been expensive. I have discovered a way of utilizing old rubber for many purposes without subjecting it to the expensive processes above mentioned. I take scraps or pieces of rubber, or any old rubber articles which have lost their usefulness through age, and divide them into particles by grinding or cutting, and I then cement together the particles or pieces so produced while they are under pressure in any suitable mold. The pressure brings the particles into close contact so as to make a compact mass and the cement acts to hold the particles together so that the product has the appearance of ordinary rubber. It will not have as great tensile strength as new rubber but it will have the same elasticity and strength so far as compression is concerned and it may be used in many places where more expensive rubber would otherwise be necessary. The cementing may be done in various ways and may include the use of a separate cementing material or I may subject the particles to treatment with a cold cure solution which will act on the surface of the particles and make them adhere firmly in a compact mass. When I make use of a separate cementing material the mascerated particles are coated in any suitable way with the well-known rubber cement or with liquid rubber, and after they are thoroughly coated the particles are subjected to pressure in a mold so as to bring the mass into compact form and the pressure is maintained until the cementing material dries or is vulcanized. Heat may be used to assist the operation when the material is under pressure but it will be understood that this heat is not such as to revulcanize the entire mass but that it is intended merely to vulcanize the cementing material. The mass is also subjected to pressure when it is treated with a curing acid for the purpose of cementing it.

It will of course be understood that the particles of rubber may be dipped in cement or its equivalent or may be covered or coated in any suitable way, and it will also be understood that the mold in which the mass is compressed may be of any desired shape or construction.

The cementing composition may be made in the shape of any article desired and it may be used as a filler for vehicle tires. The material may be stuffed into a rubber tube or hose and may be cemented in place, the hose serving to hold the material during the operation, and it will be understood that the hose may be subjected to pressure, flattening it or changing its shape.

Having thus described my invention what I claim is:

A rubber composition comprising particles or strips of appreciable size of soft vulcanized rubber pressed into close contact and held together by rubber cement vulcanized while the mass is under pressure.

In testimony whereof I affix my signature in presence of two witnesses.

WILLIAM F. BEASLEY.

Witnesses:
 ARTHUR L. BRYANT,
 JOHN M. COIT.